US005445287A

United States Patent [19]

Center et al.

[11] Patent Number: 5,445,287

[45] Date of Patent: Aug. 29, 1995

[54] CO-DISPENSING SNACK FOOD PRODUCTS AND BEVERAGES FROM A VENDING MACHINE

[75] Inventors: John L. Center; James W. Stalder, both of Dallas, Tex.

[73] Assignee: Recot, Inc., Wilmington, Del.

[21] Appl. No.: 289,537

[22] Filed: Aug. 12, 1994

[51] Int. Cl.[6] ........ B65G 59/00

[52] U.S. Cl. ........ 221/1; 221/150 R; 221/199

[58] Field of Search ........ 221/1, 133, 150 R, 199

[56] References Cited

U.S. PATENT DOCUMENTS

| | | | |
|---|---|---|---|
| 2,901,964 | 9/1959 | Johnson . | |
| 3,810,561 | 5/1974 | Merkl . | |
| 4,235,351 | 11/1980 | Kölbl et al. . | |
| 4,483,459 | 11/1984 | Taylor et al. . | |
| 4,591,070 | 5/1986 | Wirstlin . | |
| 4,730,750 | 3/1988 | Ficken | 221/133 X |
| 4,852,767 | 8/1989 | Humphrey . | |
| 4,920,764 | 5/1990 | Martin | 221/150 R X |
| 4,991,740 | 2/1991 | Levasseur . | |
| 4,997,106 | 3/1991 | Rockola . | |
| 5,147,068 | 9/1992 | Wright . | |
| 5,176,287 | 1/1993 | Suris . | |
| 5,199,598 | 4/1993 | Sampson . | |
| 5,207,784 | 5/1993 | Schwartzendruber . | |

OTHER PUBLICATIONS

"Health Gards" advertisement from Vending Times, Jul. 1987, p. 14.

*Primary Examiner*—William E. Terrell
*Assistant Examiner*—Dean A. Reichard
*Attorney, Agent, or Firm*—Rothwell, Figg, Ernst & Kurz

[57] ABSTRACT

A process for co-dispensing beverages and snack food products from a single vending machine. Filled beverage containers and filled snack food containers are stored in the vending machine and a buyer, upon payment, product selection, etc., can obtain both a beverage, e.g., a soft drink, and a snack food, e.g., corn chips, from a single machine. The beverage and snack food containers preferably are of substantially the same size so that a vending machine of the type which dispenses containers having a uniform size may be used to carry out the present invention. A process for packaging snack food product in cylindrical containers also is disclosed.

7 Claims, 3 Drawing Sheets

CO-DISPENSING SNACK FOOD PRODUCTS AND BEVERAGES FROM A VENDING MACHINE

BACKGROUND OF THE INVENTION

1. Field of the Invention

The present invention relates generally to processes for dispensing containers from vending machines or the like and, more particularly, to processes for dispensing both snack food products and beverages from a single vending machine. The present invention also relates to a novel process for packaging snack food products in cylindrical containers, including containers suitable for being dispensed by a vending machine.

2. Description of Relevant Art

It is well known in the prior art to dispense beverages, e.g., cans of soft drinks, from a coin-operated vending machine. Coin-operated vending machines also are used to dispense packages of food products, e.g., candy, snack foods such as potato chips or pretzels, or sandwiches.

In the snack food art, salty snack food products, e.g. corn chips, cheese snacks, pretzels, etc., typically are packaged in bags formed of flexible packaging films, or canisters formed of paperboard material. These packaging films typically are complex laminated structures that provide moisture and oxygen barrier layers to prevent premature staling or loss of product freshness. In addition, it is known to package food products such as peanuts in a metal can having a resealable lid for maintaining product freshness.

In the prior art, a plurality of vending machines often are disposed or located together in a common area, e.g., a travel rest area or a snack bar. The machines contain and dispense various beverages, snack foods, candy, etc. However, in arrangements of the above-described type, the separate vending machines respectively dispense separate types of products. That is, a machine typically dispenses either beverages or food products, but not both. For example, a machine which dispenses cans of soft drinks does not dispense food products. Consequently, a purchaser cannot obtain a beverage and a snack food product from prior art soft drink vending machines.

The cost of a vending machine often prohibits its placement in certain locations where "turns," or purchases of the vended products, are not of sufficient frequency (relative to the product's shelf life) to provide an adequate return on investment. For this reason, it is not uncommon to find beverage vending machines standing alone without a snack food vending machine. Also, as beverage vending machines are refrigerated while snack food vending machines are not, there are many outdoor vending locations that are hostile to the placement of snack food vending machines due to temperature and moisture extremes.

Snack-food or rest-area vending arrangements often include an oven for cooking food products purchased from the machines. It is known in the prior art to combine a microwave oven with a food-vending machine to permit the products to be cooked and then dispensed to the purchaser. See e.g., U.S. Pat. No. 5,147,068, which teaches that the food products may be dispensed by a conventional soft drink vending machine. The U.S. Pat. No. 5,147,068, however, does not teach or suggest dispensing both a beverage product and a food product from a single vending machine but, rather, teaches only the conventional usage of a machine to dispense only one product or the other.

U.S. Pat. No. 2,901,964 discloses a vending machine with means for heating refrigerated sandwiches. The purchaser selects a type of sandwich which is then heated and dispensed by the machine. U.S. Pat. No. 5,207,784 discloses a monitoring system for monitoring the inventory status of vending machines from a remote location. U.S. Pat. No. 3,810,561 discloses a vending machine for dispensing containers having a circular cross-section through a discharge port. The U.S. Pat. No. 3,810,561 teaches that although the containers typically will be cans of soda, other items also can be dispensed in the circular containers. However, as with the patents mentioned above, the U.S. Pat. No. 3,810,561 does not teach or suggest dispensing both a beverage and food product from a single soft drink vending machine.

It is apparent that prior art product vending or dispensing apparatus, such as those discussed above, dispense either a beverage or a food product and, therefore, do not permit a purchaser to obtain both a beverage, e.g. a soft drink, and a snack food product, e.g. corn chips, from a single soft drink vending machine. Accordingly, there is a need in the art for improved dispensing of such products.

SUMMARY OF THE INVENTION

The present invention provides a process for co-dispensing beverages and snack food products from a single vending machine, i.e., dispensing both filled beverage containers and filled food product containers from the same vending machine. Although not absolutely necessary to carry out the process of the present invention, the food product containers preferably have a size and shape substantially the same as the size and shape of the beverage containers. For example, both containers can be aluminum cans with a removable opening. This permits a conventional, refrigerated soft drink vending machine to be used to dispense both beverages and food products according to the present invention. Thus, the present invention provides a highly economical and efficient system for dispensing both refrigerated beverages and snack foods via pre-existing soft drink vending machines.

BRIEF DESCRIPTION OF THE DRAWINGS

Other objects, features and advantages of the present invention will become more apparent from the following detailed description of a preferred embodiment thereof taken in conjunction with the accompanying drawing figures, wherein.

DETAILED DESCRIPTION OF PREFERRED EMBODIMENTS

As stated above, the present invention provides a process for co-dispensing beverages and food products from a single vending machine. For the sake of simplicity, apparatus which may be utilized to carry out the process of the present invention will be referred to collectively as vending machines. Such apparatus include, but are not limited to, conventional coin-operated soft drink vending machines known in the art.

Figure 1A:
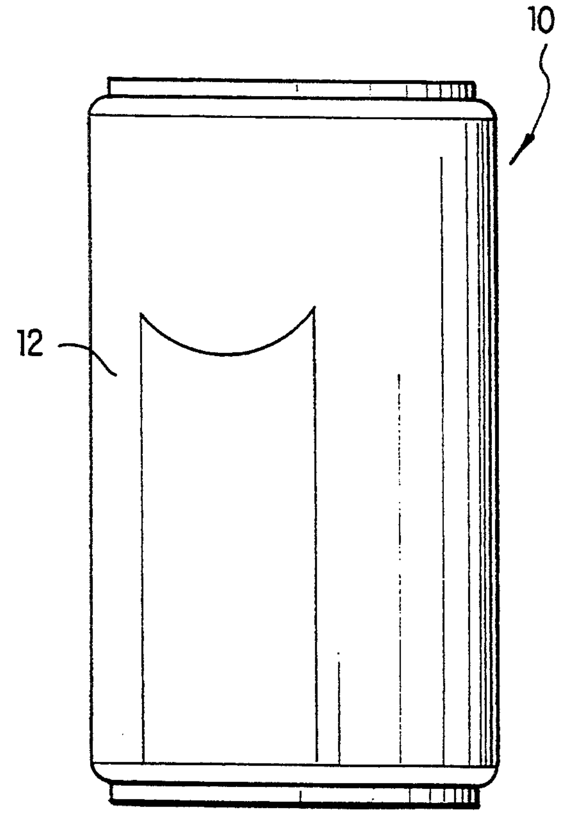
FIGS. 1A and 1B, respectively, are elevation views of a filled beverage container and a filled food product container which may be dispensed from a single vending machine according to the process of the present invention.
Figure 1B:
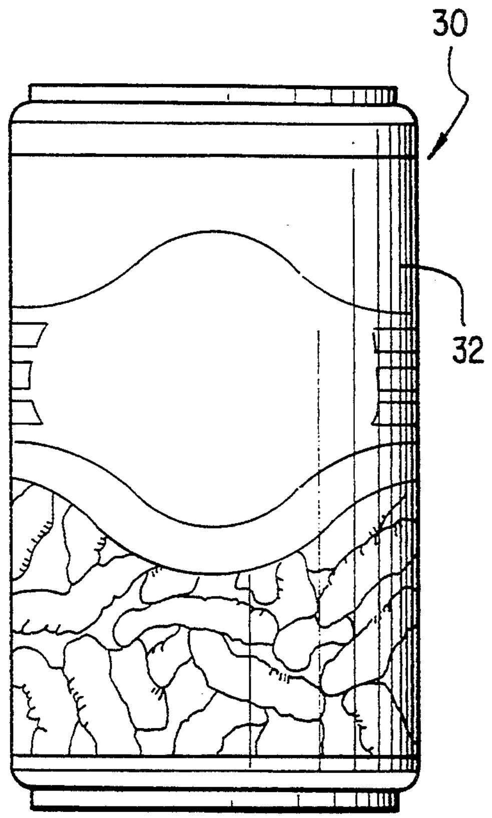
Figure 2A:
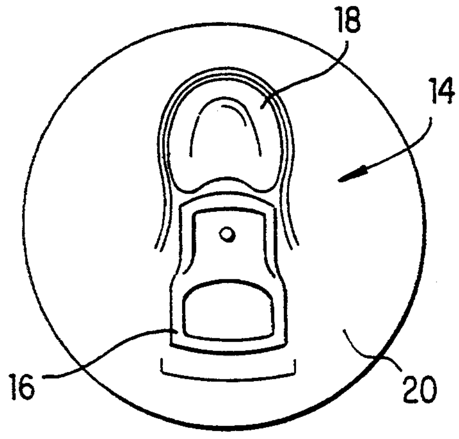
FIGS. 2A and 2B, respectively, are plan views of the containers depicted in FIGS. 1A and 1B.

FIG. 1 depicts a filled beverage container 10 and a filled snack food product container 30. The beverage container 10 preferably is aluminum and has a shape and size such that the container can be dispensed by a conventional soft drink vending machine. Beverage container 10 can be in the form of a conventional recyclable aluminum soft drink can including a body 12 with suitable advertising indicia as seen in FIG. 1A, and a pop-top or like easy opening closure indicated generally at 14 (FIG. 2A). Closure 14 is conventional and includes a pull ring 16 which when lifted upward punches section 18 from upper surface 20 to provide an outlet, all as known in the art.

Figure 2B:
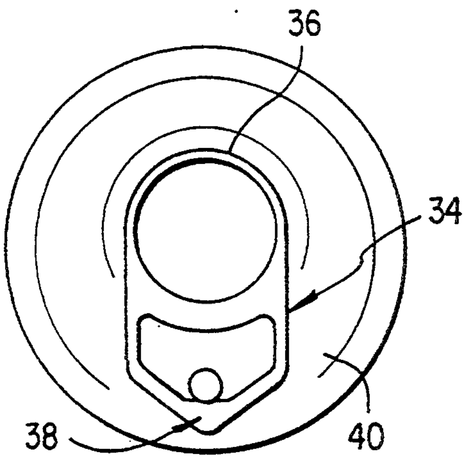

Snack food product container 30 likewise can be in the form of a recyclable aluminum can having a body 32 with advertising indicia and an easy-opening closure indicated generally at 34 (FIG. 2B). As will be explained below, utilizing a snack food container that has the same or substantially the same size and shape as a conventional soft drink can permits a conventional soft drink vending machine to be used in practicing the present invention. Closure 34 differs from the closure 14 of beverage container 10 in that the entire upper surface 40 of container 30 preferably is removed to gain access to the contents thereof, i.e., the snack food product which, in FIG. 1B, is a snack food marketed by Frito-Lay, Inc. under the trademark CHEE TOS® brand cheese flavored snacks. Pull ring 36 is grasped and lifted upward to depress portion 38 of surface 40 so as to permit easy removal thereof. This type of closure is known in the art and, therefore, is not discussed in further detail.

It will be recognized that containers 10 and 30 may be of any size. For example, the containers may have a 12 or 16 fluid ounce capacity, or any other fluid capacity. Fluid capacity, of course, refers to both containers 10 and 30 although only container 10 contains a beverage. In a preferred embodiment, both container 10 and container 30 have a 12 fluid ounce capacity, and, therefore, may be dispensed by a conventional soft drink vending machine.

Figure 3:
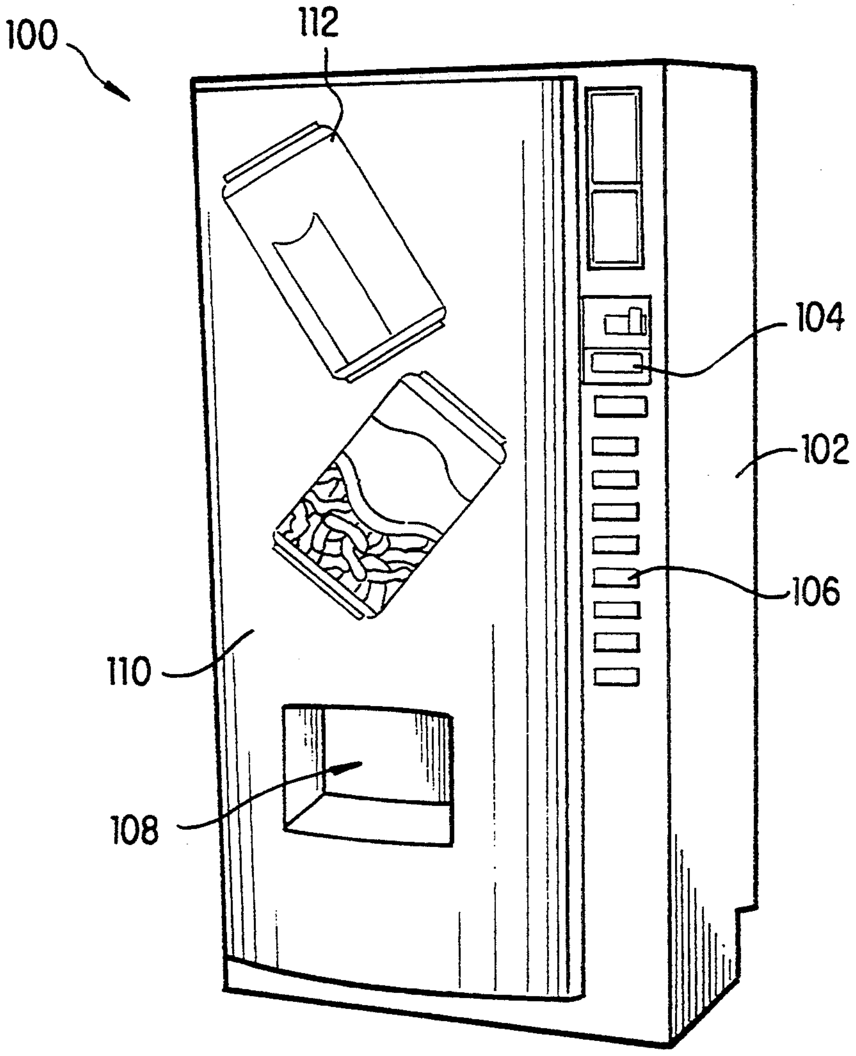
FIG. 3 is a perspective schematic view of a vending machine that may be used in carrying out the process of the present invention.

FIG. 3 shows a perspective schematic view of a vending machine for dispensing both food and drink containers according to the present invention. The vending machine 100 includes an outer housing 102, a payment mechanism 104, a selector panel mechanism 106, and a dispensing outlet 108. The vending machine 100 further includes a front door 110 which is pivotally connected to housing 102 and can be opened to provide access to the interior of the machine to, e.g., refill the product supply and collect the money deposited in the machine. The front door 110 of vending machine 100 can have a suitable advertising display or indicia 112 which, in FIG. 1, depicts a beverage item and a snack food item contained therein.

The operation of vending machine 100 is well known to and appreciated by those skilled in the art and thus will not be explained in any great detail herein. As mentioned above, the process of the present invention can be carried out utilizing conventional soft drink vending apparatus, i.e., the present invention does not require a specifically designed vending machine. Thus, the operation of such apparatus in response to the insertion of money therein will not be described in detail. The process of the present invention can be practiced with a vending machine having sufficient internal space for storage of filled beverage and snack food containers, and means for permitting a user to select a specific beverage or food item which item is dispensed upon the insertion of sufficient money in the machine. Accordingly, it is possible to employ a conventional soft drink vending machine by using a portion of the soft drink container storage area for food product containers. Thus, the structure (e.g. tracks) used to convey or direct soft drink containers to the outlet from the stacks in that portion of the storage area, according to the present invention, instead direct snack food containers to the outlet from the stacks in that storage portion.

Although those skilled in the art will appreciate the use of a conventional vending machine to carry out the present invention (as described above), a brief discussion of such a machine will be made for the sake of clarity.

Conventional soft drink vending machines typically have a plurality of holding stacks of a certain width and depth for holding a supply of soft drink containers. A dispenser mechanism typically is disposed at a lower portion of each holding stack and is operable by a drive mechanism. The drive mechanisms, in response to purchaser selection, operate the respective dispenser mechanisms to dispense a soft drink container via the vending machine outlet. For example, U.S. Pat. No. 4,991,740 discloses a known type of vending machine that may be used in carrying out the process of the present invention. The U.S. Pat. No. 4,991,740 discloses a vending machine including horizontally-spaced container stacks with respective release mechanisms and a single machine outlet, as disclosed in FIGS. 1–5 and columns 4–8 of the U.S. Pat. No. 4,991,740, which disclosure is expressly incorporated by reference into the present application. However, those skilled in the art, of course, will appreciate that other vending machine structures and apparatus may be used as well.

Other known vending machines, e.g., those which include vertically-spaced container stacks, may also be used to carry out the present invention. U.S. Pat. No. 4,483,459 discloses a machine having vertically-spaced container stacks, as seen in FIGS. 2 and 3 therein. The operation of the vending machine in the U.S. Pat. No. 4,483,459 patent is disclosed in FIGS. 2–5 and columns 2–5, which disclosure also is expressly incorporated by reference in the present application.

In a preferred embodiment of the present invention, the snack food container 30 is pressurized at about 5–15 psi (pounds per square inch) to give it added strength so as to prevent the container (and snack food product) from being crushed or damaged during transportation, storage, etc.

Figure 4:
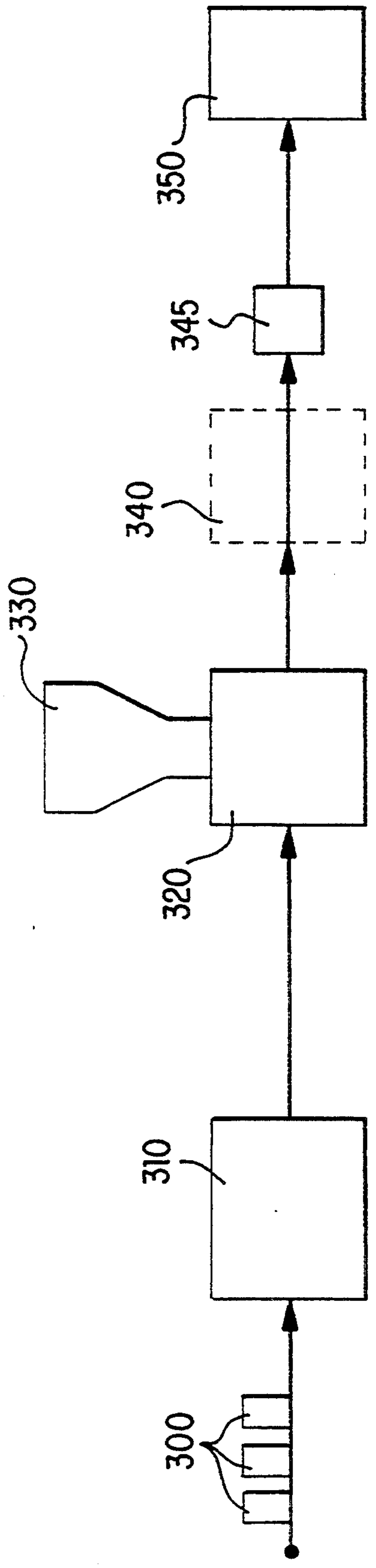
FIG. 4 is a schematic diagram of a process for packaging snack foods in a cylindrical container.

With reference to FIG. 4, a process for packaging snack foods in cylindrical containers 300 will now be described. The empty containers 300, which are open at the top thereof, preferably are flushed with nitrogen gas at a flushing station 310 to remove any oxygen present therein. The containers then are fed or directed to a filling station 320 equipped with a device or assembly that includes a filling head for dispensing precise metered amounts of the snack food product, e.g. corn chips, pretzels, cheese snacks, etc., from a supply 330 into the empty containers 300. The filling equipment can be in the form of a rotary table, conveyor belt or system, etc. The containers 300 should be positively captured or controlled during the filling process so that the amount of product placed therein can be controlled very accurately.

It may be desirable to also flush the product itself with nitrogen gas so as to substantially remove the oxygen captured or trapped therein to provide longer shelf life for the product. This can be done before the product is placed in the containers or, alternatively, may be accomplished after filling (but before sealing) of the containers by passing the filled containers through area 340 (shown in phantom). Area 340 may be in the form of a tunnel, chamber, etc., that contains a nitrogen rich environment to remove oxygen from the product as the containers pass therethrough. It is desirable to reduce the oxygen content of the product to about 2% or less in order to provide long shelf life and product freshness.

The containers are then sealed with a lid at a sealing station 350. The sealing of the containers may take place while the containers still are within the nitrogen environment, i.e., area 340 in FIG. 4.). The lids used to seal the containers, as described above with respect to FIG. 2B, are designed for easy removal. In a preferred embodiment, a small amount of liquid nitrogen is placed in the filled containers before the containers are sealed, as indicated by reference numeral 345 in FIG. 4. The liquid nitrogen evaporates after the containers are sealed to provide additional internal pressurization of the container, which in turn provides increased columnar and overall strength against crushing or deformation. In addition, the pressurization of the snack food container causes an audible noise upon opening which indicates the fresh and untampered condition of the product. As described above with respect to filled snack food container 30 shown in FIGS. 1B and 2B, the purchaser simply pulls up the ring 36 and completely removes cover 40 to gain access to the product.

As mentioned above, a significant benefit of packaging the snack foods in a container having substantially the same size and shape as a soft drink can is that conventional soft drink vending machines may be used to carry out the present invention. Therefore, while it is not necessary to utilize such similarly sized cans for packaging or containing the snack food products, a preferred embodiment of the present invention employs the same size can for both the beverage and snack food containers.

Another benefit of utilizing the soft drink vending machine in carrying out the process of the present invention is that the refrigerated environment present in the machine will maintain freshness of the snack food product for a longer period of time compared with storing such products at ambient temperatures. The lower storage temperature retards the oxidation of oil within the snack food, which in turn preserves the snack food's flavor for a longer period of time.

It is apparent that the present invention provides an improved process for dispensing both beverages and snack food products from a vending machine, as well as a process for packaging snack foods in cylindrical containers suitable for being dispensed from a vending machine.

Although the present invention has been described with reference to particular embodiments, it is to be understood that the embodiments are merely illustrative of the application of the principles of the invention. Numerous configurations may be made therewith and other arrangements may be devised without departing from the spirit and scope of the invention.

We claim:

1. A process for dispensing beverages and snack food products from a single vending machine, the process comprising steps of:

providing a vending machine having a storage portion for storing containers which have a predetermined size and shape so as to be receivable in the storage portion of said vending machine;

placing a plurality of containers filled with a beverage in the storage portion of said vending machine, each of the filled beverage containers having substantially the same size and shape; and placing a plurality of containers filled with a snack food product in the storage portion of said vending machine, each of the filled snack food containers having a size and shape that are substantially the same as the size and shape of the filled beverage containers;

whereby said vending machine is capable of dispensing both a filled beverage container and a filled snack food container when operated by a user.

2. A process according to claim 1, wherein the plurality of beverage containers and the plurality of snack food containers comprise an aluminum can with a removable access opening.

3. A process according to claim 1, wherein the beverage containers and the snack food containers comprise a cylindrically-shaped can which has about a 12 fluid ounce capacity.

4. A process according to claim 1, wherein the storage portion of said vending machine is refrigerated.

5. A process for dispensing both filled beverage containers and filled snack food containers from a vending machine configured to dispense soft drink containers, the process comprising steps of:

providing a vending machine having at least first and second refrigerated storage portions, both of said refrigerated storage portions configured to receive stacks of containers, the containers having a uniform size such that when filled the machine contains a plurality of containers all having a uniform size, the vending machine further including means for selecting either a beverage or snack food container and means, responsive to the selecting means, for dispensing the selected container through an outlet of the machine;

placing a plurality of containers filled with a beverage in the first refrigerated storage portion of said vending machine; and placing a plurality of containers filled with a snack food product in the second refrigerated storage portion of said vending machine, the plurality of snack food containers and the plurality of beverage containers having a uniform size;

whereby a customer may obtain both a snack food product and a beverage from said vending machine.

6. A single vending machine for dispensing both filled beverage containers and filled snack food containers, the vending machine configured to dispense uniform size containers, the machine comprising:

at least first and second refrigerated storage portions, both of said refrigerated storage portions being configured to receive stacks of containers, the vending machine further including means for selecting either a beverage or snack food container and means, responsive to the selecting means, for dispensing the selected container through an outlet of the machine;

a plurality of containers filled with a beverage being disposed in the first refrigerated storage portion of said vending machine; and a plurality of containers filled with a snack food product being disposed in the second refrigerated storage portion of said vending machine;

wherein the plurality of snack food containers and the plurality of beverage containers have a substantially uniform size so that the first and second storage portions of said machine can receive either the snack food containers or the beverage containers;

whereby a customer may obtain both a snack food product and a beverage from said single vending machine.

7. A vending machine according to claim 6, wherein the beverage containers and the snack food containers comprise a cylindrically-shaped can which has about a 12 fluid ounce capacity.

* * * * *